C. R. WINKLER.
STEAM COOKING APPARATUS.
No. 174,048. Patented Feb. 22, 1876.
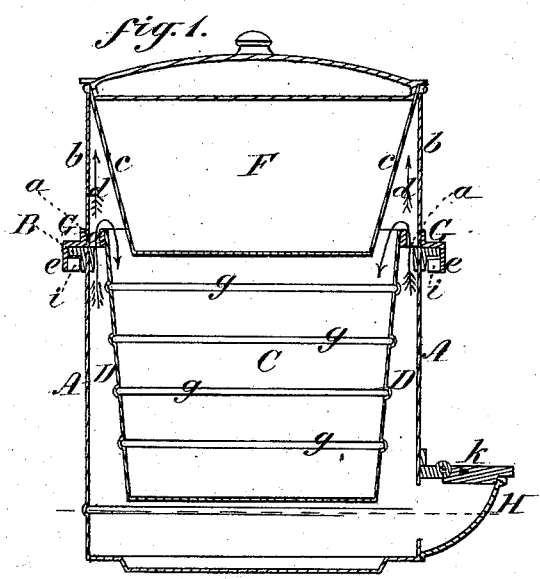
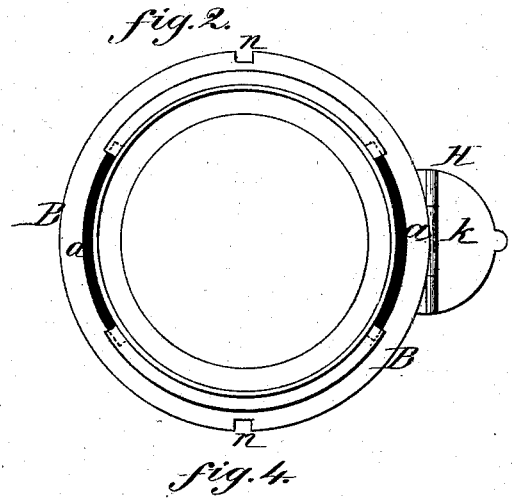
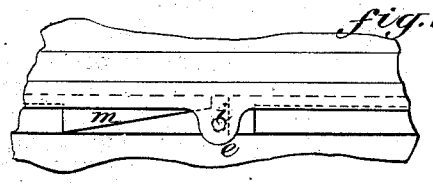
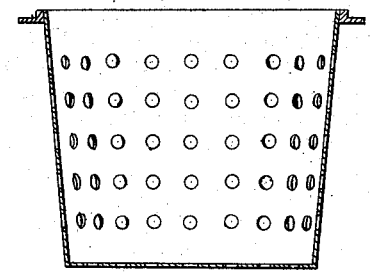
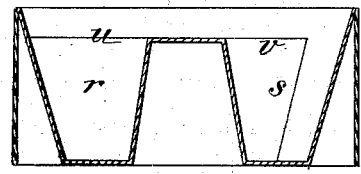
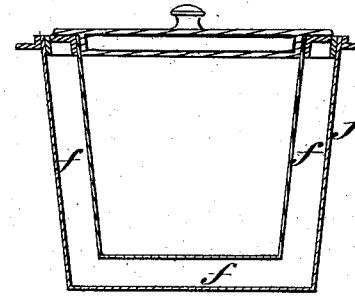
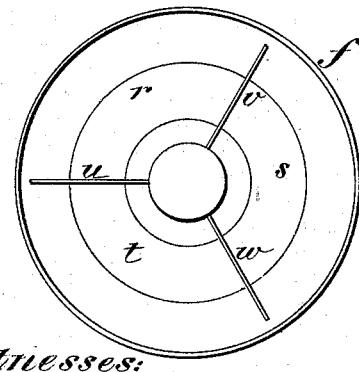
Witnesses:
Inventor:
Carl Rudolph Winkler,
by Johnson & Johnson,
Attorneys

UNITED STATES PATENT OFFICE.

CARL R. WINKLER, OF TOLEDO, OHIO, ASSIGNOR OF ONE-HALF HIS RIGHT TO GEORGE FISHER, OF SAME PLACE.

IMPROVEMENT IN STEAM COOKING APPARATUS.

Specification forming part of Letters Patent No. 174,048, dated February 22, 1876; application filed January 13, 1876.

*To all whom it may concern:*

Be it known that I, CARL RUDOLPH WINKLER, of Toledo, in the county of Lucas and State of Ohio, have invented new and useful Improvements in Steam Cooking Apparatus, of which the following is a specification:

My invention relates to steam cooking apparatus, and which I have designed with a view to cook different kinds of articles by the direct or indirect application of steam. In the accomplishment of this I construct the main or reservoir vessel with a top flange, extending both outside and inside, and provide the inner portion with segmental openings, which communicate with the steam-space, and combine therewith a food-receiving vessel, having segmental collars or flanges, which may be turned to open and close the segmental openings to allow the passage of the steam into the lower vessel, and around the sides and bottom of an upper vessel, and to cut off such communication, whereby different kinds of food may be cooked at the same time—one kind by the direct contact, and the other by the indirect contact, of the steam. This is found very advantageous, as it is not desirable to cook some articles by direct steam. The upper vessel is provided with flange-locking devices, the action of which, in connection with inclines on the flange of the main vessel, tends to bind the vessels close at the flange-joint, to prevent the escape of the steam, and hold the upper vessel in place against the pressure of the steam. The base of the reservoir-vessel is provided with a lateral extension to form the seat for a downward-closing weighted valve, whereby any undue pressure of steam is allowed to escape, the valve opening under such pressure to avoid explosion, and the water supplied as may be necessary. A single food-receiving vessel may be used only within the main or reservoir vessel, and when two are employed the upper one must be of less size to allow the free passage of steam around it and into the lower vessel. A perforated vessel is used in the lower vessel chiefly for steaming meats and saving the juices and nutriment. Single and double walled imperforate vessels are used for cooking vegetables, soups, and all kinds of farinaceous food, as well as for frying and roasting meats, baking bread, and roasting coffee. I propose, also, to partition the upper vessel to cook different articles therein at the same time, in which case it may be constructed with a central chamber opening into the steam-vessel to obtain the largest cooking-surface.

The particular features which form the subject of this patent will be specifically pointed out and embraced in the claims.

In the accompanying drawings, Figure 1 represents a vertical section of a steam cooking apparatus embracing my invention; Fig. 2, a top view of the main or reservoir vessel, showing the flange segmental openings and the lower cooking-vessel in place, and its segmental flanges partially covering the steam-openings; Fig. 3, an elevation, showing the flange-locking devices; Fig. 4, a section of a perforated vessel; Figs. 5 and 6, a top view and section of a partitioned vessel; and Fig. 7, a section of a double-walled vessel.

The main vessel A receives the water, and is fitted for use upon a stove or range to generate the steam. It is provided at the open top with a flange or collar, B, extending both outside and inside of the wall. The inside extension is cut away in segments to form, when the lower cooking-vessel C is in place in the steam-chamber, segmental openings a, Fig. 2, through which the steam passes from the steam-chamber D into the open top of the lower cooking-vessel.

As it is desirable to cut off this direct steam communication in cooking certain kinds of food, I provide the lower food-receiving vessel C with segmental flanges or collars E, by which it is supported upon the top flange B, and by which the segmental openings a are closed by simply turning the lower vessel in position to bring the segmental flanges E over the openings so as to cover them. In this particular it will be seen the flanges serve two purposes, and the steam can be cut off and let on to the article being cooked by a simple turning movement of the inner lower vessel. The vessel C is of less size than the steam-chamber D to allow the steam to rise freely through the flange-openings, as shown in Fig. 1. This lower vessel may be provided with a cover, but in such cases the steam-passages must be closed. When, however, an upper cooking-vessel, F, is used the steam-passages must be open to let the steam rise. For this purpose I construct the upper vessel with a double wall, $b\ c$, the inner one $c$ of which fits within the open top of the lower vessel, and the steam passes up into the space $d$ between the double walls, which space thereby forms a continuation of the lower steam-chamber D by means of the segmental openings. The base of this upper vessel has a flange or rim, G, and this I provide with vertical ears $e$, from which pins $i$ extend inward in positions to enter notches $n$ in the flange B of the reservoir-vessel, and by turning the upper vessel slightly the pins $i$ pass under inclines $m$, Fig. 3, formed upon the under side of the top flange B, and thus bind the two vessels together, and close the flange-joint. This locking device also prevents the upper vessel from being raised off its supporting-flange by the pressure of the steam. These locking devices are arranged diametrically opposite, and one of them is shown in Fig. 3.

For cooking several different articles at the same time I divide the upper vessel into several chambers, $r\ s\ t$, by partitions $v\ w\ x$, as shown in Figs. 5 and 6. This I find to be of great advantage, and dispenses with the necessity of providing a number of small vessels. For cooking meats by direct steam a lower perforated vessel is used, as shown at Fig. 4. For roasting, frying, and baking bread, &c., the lower vessel has a double wall, as shown in Fig. 7. All these vessels are provided with flanges, and set in the reservoir-chamber in the manner shown in Fig. 1. The perforated vessel, however, is set into the lower vessel C in order to retain the juices and nutriment of the meat.

The double-walled vessel, shown in Fig. 7, has a closed chamber, $f$, surrounding the inner wall, and thereby bakes with more uniformity than can be obtained by a single wall. The mouth of the lateral valved-extension H forms the gage whereby to determine the height to which the reservoir is filled with water to generate the steam, and the weighted valve $k$ keeps the mouth closed.

The lower cooking-vessel C is provided with a series of annular beads, $g$, of such distances apart as will allow the water to be gaged to suit whatever is to be cooked. This is found to be very convenient in cooking a certain quantity of food.

Double-bottomed lids are fitted for the several vessels so as to retain the full heat of the steam within the vessel.

It will be observed the downwardly-closing valve $k$ is weighted to an extent that allows it to remain closed under a certain pressure of steam, and to open automatically when the steam rises above a safe pressure, and thereby avoid all accidents.

I claim—

1. The reservoir-vessel A, having a flanged top, B, provided with segmental openings $a\ a$, and combined with the lower cooking-vessel C, provided with segmental flanges E E, coinciding and co-operating therewith, and the upper vessel F, to open and close the steam communication with said upper vessel for the purpose set forth.

2. The combination, with the reservoir-vessel A and the inner cooking-vessel C, provided with flanged steam-passages $a\ a$, opened and closed, as described, of an upper vessel, F, provided with double walls, whereby the upper space $d$, formed by said double walls, is made to form a continuation of the lower steam-chamber.

3. The combination, with the reservoir-vessel A, of the closed double-wall vessel, having the closed chamber $f$, as and for the purpose specified.

4. The combination, with reservoir-vessel A and the lower cooking-vessel C, of an upper double-walled vessel, F, with communications $a\ a$, governed as described, provided with separate cooking-chambers $r\ s\ t$, as and for the purpose set forth.

In testimony whereof I have affixed my signature in the presence of two witnesses.

CARL RUDOLPH WINKLER.

Witnesses:
 AVERY S. HILL,
 BYRON F. RITCHIE.